(12) United States Patent
Kim et al.

(10) Patent No.: US 7,336,337 B2
(45) Date of Patent: Feb. 26, 2008

(54) LIQUID CRYSTAL DISPLAY DEVICE AND METHOD OF FABRICATING THE SAME

(75) Inventors: Jong Woo Kim, Kyongsangbuk-do (KR); Sung Chun Kang, Kyongsangbuk-do (KR); Young Hun Ha, Kyongsangbuk-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 0 days.

(21) Appl. No.: 11/542,168

(22) Filed: Oct. 4, 2006

(65) Prior Publication Data

US 2007/0030437 A1    Feb. 8, 2007

Related U.S. Application Data

(62) Division of application No. 10/318,159, filed on Dec. 13, 2002.

(30) Foreign Application Priority Data

Dec. 22, 2001    (KR)    ............... P2001-083219

(51) Int. Cl.
*G02F 1/1339*    (2006.01)
(52) U.S. Cl. ...................... 349/190; 349/153
(58) Field of Classification Search ............... 349/190, 349/153
See application file for complete search history.

(56) References Cited

U.S. PATENT DOCUMENTS

| 3,978,580 A | 9/1976 | Leupp et al. |
|---|---|---|
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,684,555 A * | 11/1997 | Shiba et al. ............... 349/149 |
| 5,742,370 A | 4/1998 | Kim et al. |
| 5,757,451 A | 5/1998 | Miyazaki et al. |

(Continued)

FOREIGN PATENT DOCUMENTS

EP    1 003 066 A1    5/2000

(Continued)

*Primary Examiner*—Michael H. Caley
(74) *Attorney, Agent, or Firm*—McKenna Long & Aldridge LLP

(57) ABSTRACT

A liquid crystal display device and a method of fabricating the same are disclosed in the present invention. The liquid crystal display device includes a first substrate having a thin film transistor array and a common line with a UV-ray irradiation path passing UV-rays, a second substrate having a color filter array, a sealant between the first and second substrates over the common line, and a liquid crystal layer between the first and second substrates.

15 Claims, 7 Drawing Sheets

U.S. PATENT DOCUMENTS

| | | | |
|---|---|---|---|
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A * | 12/1999 | Yamada et al. | 156/106 |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,118,509 A * | 9/2000 | Miyake | 349/153 |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,292,249 B1 * | 9/2001 | Kane et al. | 349/155 |
| 6,304,306 B1 | 10/2001 | Shiomi et al. | |
| 6,304,311 B1 | 10/2001 | Egami et al. | |
| 6,320,638 B1 * | 11/2001 | Youn | 349/154 |
| 6,337,730 B1 | 1/2002 | Ozaki et al. | |
| 6,414,733 B1 | 7/2002 | Ishikawa et al. | |
| 6,424,394 B1 * | 7/2002 | Morii | 349/110 |
| 6,646,689 B2 * | 11/2003 | Matsuda | 349/1 |

FOREIGN PATENT DOCUMENTS

| | | |
|---|---|---|
| JP | 51-65656 | 6/1976 |
| JP | 57-38414 | 3/1982 |
| JP | 57-038414 | 3/1982 |
| JP | 57-88428 | 6/1982 |
| JP | 57-088428 | 6/1982 |
| JP | 58-27126 | 2/1983 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-007822 | 1/1986 |
| JP | 61-55625 | 3/1986 |
| JP | 61-055625 | 3/1986 |
| JP | S62-054225 | 3/1987 |
| JP | S62-054228 | 3/1987 |
| JP | S62-054229 | 3/1987 |
| JP | 61-089025 | 4/1987 |
| JP | 62-89025 | 4/1987 |
| JP | 62-090622 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-127179 | 5/1993 |
| JP | 05-154923 | 6/1993 |
| JP | 5-265011 | 10/1993 |
| JP | 05-265011 | 10/1993 |
| JP | 05-281557 | 10/1993 |
| JP | 5-281557 | 10/1993 |
| JP | 05-281562 | 10/1993 |
| JP | 5-281562 | 10/1993 |
| JP | H06-018829 | 1/1994 |
| JP | 6-51256 | 2/1994 |
| JP | 06-051256 | 2/1994 |
| JP | H06-064229 | 3/1994 |
| JP | 6-148657 | 5/1994 |
| JP | 06-148657 | 5/1994 |
| JP | 06-160871 | 6/1994 |
| JP | 6-160871 | 6/1994 |
| JP | H06-194637 | 7/1994 |
| JP | 06-235925 | 8/1994 |
| JP | 6235925 | 8/1994 |
| JP | 6-265915 | 9/1994 |
| JP | 06-265915 | 9/1994 |
| JP | 06-313870 | 11/1994 |
| JP | 07-084268 | 3/1995 |
| JP | 7-128674 | 5/1995 |
| JP | 07-128674 | 5/1995 |
| JP | 07-181507 | 7/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 08-095066 | 4/1996 |
| JP | 08-101395 | 4/1996 |
| JP | 8-106101 | 4/1996 |
| JP | 08-106101 | 4/1996 |
| JP | 8101395 | 4/1996 |
| JP | H08-110504 | 4/1996 |
| JP | H08-136937 | 5/1996 |
| JP | 08-171094 | 7/1996 |
| JP | 8-171094 | 7/1996 |
| JP | 08-171097 | 7/1996 |
| JP | 8-190099 | 7/1996 |
| JP | 08-190099 | 7/1996 |
| JP | H08-173874 | 7/1996 |
| JP | 08-240807 | 9/1996 |
| JP | 8-240807 | 9/1996 |
| JP | 9-5762 | 1/1997 |
| JP | 09-005762 | 1/1997 |
| JP | 9-26578 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 9-73075 | 3/1997 |
| JP | 09-073075 | 3/1997 |
| JP | 09-073096 | 3/1997 |
| JP | 9-73096 | 3/1997 |
| JP | 9061829 | 3/1997 |
| JP | H09-094500 | 4/1997 |
| JP | 9-127528 | 5/1997 |
| JP | 09-127528 | 5/1997 |
| JP | 9-230357 | 9/1997 |
| JP | 09-230357 | 9/1997 |
| JP | 09-281511 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10177178 | 6/1998 |
| JP | H10-174924 | 6/1998 |
| JP | 10-221700 | 8/1998 |
| JP | 10-282507 | 10/1998 |
| JP | 10-282512 | 10/1998 |
| JP | 10-333157 | 12/1998 |
| JP | 10-333159 | 12/1998 |
| JP | 10333157 | 12/1998 |
| JP | 10333159 | 12/1998 |
| JP | 11-14953 | 1/1999 |
| JP | 11-014953 | 1/1999 |
| JP | 11-38424 | 2/1999 |
| JP | 11-038424 | 2/1999 |
| JP | 11-64811 | 3/1999 |

| | | | | | | |
|---|---|---|---|---|---|---|
| JP | 11-064811 | 3/1999 | | JP | 2001-281675 | 10/2001 |
| JP | 11-109388 | 4/1999 | | JP | 2001-281678 | 10/2001 |
| JP | 11-133438 | 5/1999 | | JP | 2001-282126 | 10/2001 |
| JP | 11-142864 | 5/1999 | | JP | 2001-305563 | 10/2001 |
| JP | 11133438 | 5/1999 | | JP | 2001-330837 | 11/2001 |
| JP | 11142864 | 5/1999 | | JP | 2001-330840 | 11/2001 |
| JP | 11-174477 | 7/1999 | | JP | 2001-356353 | 12/2001 |
| JP | 11-212045 | 8/1999 | | JP | 2001-356354 | 12/2001 |
| JP | 11-248930 | 9/1999 | | JP | 2002-014360 | 1/2002 |
| JP | 11248930 | 9/1999 | | JP | 2002-14360 | 1/2002 |
| JP | H11-262712 | 9/1999 | | JP | 2002-023176 | 1/2002 |
| JP | H11-264991 | 9/1999 | | JP | 2002-23176 | 1/2002 |
| JP | 11-326922 | 11/1999 | | JP | 2002-49045 | 2/2002 |
| JP | 11326922 | 11/1999 | | JP | 2002-049045 | 2/2002 |
| JP | 11-344714 | 12/1999 | | JP | 2002-079160 | 3/2002 |
| JP | 2000-002879 | 1/2000 | | JP | 2002-080321 | 3/2002 |
| JP | 2000-029035 | 1/2000 | | JP | 2002-82340 | 3/2002 |
| JP | 2000-29035 | 1/2000 | | JP | 2002-082340 | 3/2002 |
| JP | 2000-056311 | 2/2000 | | JP | 2002-090759 | 3/2002 |
| JP | 2000-066165 | 3/2000 | | JP | 2002-90759 | 3/2002 |
| JP | 2000-066218 | 3/2000 | | JP | 2002-90760 | 3/2002 |
| JP | 2000-093866 | 4/2000 | | JP | 2002-090760 | 3/2002 |
| JP | 2000-137235 | 5/2000 | | JP | 2002-107740 | 4/2002 |
| JP | 2000-147528 | 5/2000 | | JP | 2002-122870 | 4/2002 |
| JP | 2000-193988 | 7/2000 | | JP | 2002-122872 | 4/2002 |
| JP | 2000-241824 | 9/2000 | | JP | 2002-122873 | 4/2002 |
| JP | 2000-284295 | 10/2000 | | JP | 2002-131762 | 5/2002 |
| JP | 2000-292799 | 10/2000 | | JP | 2002-139734 | 5/2002 |
| JP | 2000-310759 | 11/2000 | | JP | 2002-156518 | 5/2002 |
| JP | 2000-310784 | 11/2000 | | JP | 2002-169166 | 6/2002 |
| JP | 2000-338501 | 12/2000 | | JP | 2002-169167 | 6/2002 |
| JP | 2001-005401 | 1/2001 | | JP | 2002-182222 | 6/2002 |
| JP | 2001-005405 | 1/2001 | | JP | 2002-202512 | 7/2002 |
| JP | 2001-013506 | 1/2001 | | JP | 2002-202514 | 7/2002 |
| JP | 2001-033793 | 2/2001 | | JP | 2002-214626 | 7/2002 |
| JP | 2001-042341 | 2/2001 | | JP | 2002-229042 | 8/2002 |
| JP | 2001-051284 | 2/2001 | | JP | 2002-236276 | 8/2002 |
| JP | 2001-066615 | 3/2001 | | JP | 2002-258299 | 8/2002 |
| JP | 2001-091727 | 4/2001 | | JP | 2002-236292 | 9/2002 |
| JP | 2001-117105 | 4/2001 | | JP | 2002-277865 | 9/2002 |
| JP | 2001-117109 | 4/2001 | | JP | 2002-277866 | 9/2002 |
| JP | 2001-133745 | 5/2001 | | JP | 2002-277881 | 9/2002 |
| JP | 2001-133794 | 5/2001 | | JP | 2002-287156 | 10/2002 |
| JP | 2001-133799 | 5/2001 | | JP | 2002-296605 | 10/2002 |
| JP | 2001-142074 | 5/2001 | | JP | 2002-311438 | 10/2002 |
| JP | 2001-147437 | 5/2001 | | JP | 2002-311440 | 10/2002 |
| JP | 2001-154211 | 6/2001 | | JP | 2002-311442 | 10/2002 |
| JP | 2001-166272 | 6/2001 | | JP | 2002-323687 | 11/2002 |
| JP | 2001-166310 | 6/2001 | | JP | 2002-323694 | 11/2002 |
| JP | 2001-183683 | 7/2001 | | JP | 2002-333628 | 11/2002 |
| JP | 2001-201750 | 7/2001 | | JP | 2002-333635 | 11/2002 |
| JP | 2001-209052 | 8/2001 | | JP | 2002-333843 | 11/2002 |
| JP | 2001-209056 | 8/2001 | | JP | 2002-341329 | 11/2002 |
| JP | 2001-209057 | 8/2001 | | JP | 2002-341355 | 11/2002 |
| JP | 2001-209058 | 8/2001 | | JP | 2002-341356 | 11/2002 |
| JP | 2001-209060 | 8/2001 | | JP | 2002-341357 | 11/2002 |
| JP | 2001-215459 | 8/2001 | | JP | 2002-341358 | 11/2002 |
| JP | 2001-222017 | 8/2001 | | JP | 2002-341359 | 11/2002 |
| JP | 2001-235758 | 8/2001 | | JP | 2002-341362 | 11/2002 |
| JP | 2001222017 | 8/2001 | | KR | 2000-0035302 | 6/2000 |
| JP | 2001-255542 | 9/2001 | | | | |
| JP | 2001-264782 | 9/2001 | | | | |
| JP | 2001-272640 | 10/2001 | | | | |

\* cited by examiner

UV

LIQUID CRYSTAL DISPLAY DEVICE AND METHOD OF FABRICATING THE SAME

This application is a divisional of prior U.S. application Ser. No. 10/318,159, filed Dec. 13, 2002.

This application claims the benefit of the Korean Patent Application No. P2001-083219 filed on Dec. 22, 2001, which is hereby incorporated by reference.

BACKGROUND OF THE INVENTION

1. Field of the Invention

The present invention relates to a display device, and more particularly, to a liquid crystal display device and a method of fabricating the same. Although the present invention is suitable for a wide scope of applications, it is particularly suitable for facilitating hardening of a photo-hardening sealant without modifying a black matrix layer pattern or increasing a size of the substrate.

2. Discussion of the Related Art

Generally, a liquid crystal display device has characteristics, such as low-voltage driving, low power consumption, full-color implementation, thin and compact size, and the like. Thus, it has been widely used for calculators, notebook computers, electronic watches, computer monitors, aircraft gauges, personal mobile terminals, and mobile phones.

Screens of liquid crystal display devices are becoming wider and larger in size. When a wide-screen liquid crystal display is fabricated by a liquid crystal injection method, it takes too much time. For this reason, a liquid crystal dropping method has been widely used to form a liquid crystal layer. The liquid crystal dropping method includes the steps of dropping liquid crystals on a substrate before bonding two substrates, forming a photo-hardening sealant, bonding the substrates, and hardening the sealant.

The photo-hardening sealant includes a photo-hardening sealant, which becomes a radical when UV-ray is applied thereto, and a single solution type sealant mixed with acrylate polymerized by the photo-hardening sealant. Hence, in order to harden the photo-hardening sealant, a portion where the sealant is disposed is exposed to UV-ray.

Moreover, the liquid crystal dropping method uses a column spacer attached to the substrate instead of a ball spacer dispersed on the substrate to obtain a uniform cell thickness.

A liquid crystal display device and a method of fabricating the same are explained by referring to the attached drawings as follows.

FIG. 1A illustrates a layout of a thin film transistor array substrate for a related art liquid crystal display device.

FIG. 1B illustrates a cross-sectional view taken along line IB-IB in FIG. 1A.

As shown in FIG. 1A, a plurality of gate and data lines 80 and 90 are formed on an active area 120 of a thin film transistor array substrate 100 to cross each other and define a plurality of pixel areas. A pixel electrode 112 is formed at each of the pixel areas. And, a plurality of thin film transistors (not shown) are formed at each intersection between the gate and data lines 80 and 90 and apply signals of the data lines 90 to the pixel electrodes 112 by being turned on/off through signals of the gate lines 80, respectively.

A common line 140 is formed at the circumference of the active area 120 to provide a common electrode on a color filter array substrate (not shown) with a common voltage. And, a plurality of silver (Ag) dots (not shown) are formed at the common line 140 for electrical connections to the common electrode on the color filter array substrate.

Moreover, a column spacer 105 is formed on the gate or data line 80 or 90 to maintain a uniform cell gap. And, a photo-hardening sealant 110 is formed at the circumference of the active area 120 to surround the active area 120 for bonding the thin film array substrate and the color filter array substrate to each other. In this case, the photo-hardening sealant 110 is partially formed on the common line 140.

Hence, in order to bond the substrates with the photo-hardening sealant 110 and to fix the photo-hardening sealant 110 thereto, UV-ray is applied from the color filter array substrate side or a thermo-hardening sealant is used instead of the photo-hardening sealant.

When the UV-ray is applied from the thin film transistor array substrate side, the UV-ray cannot be applied to the photo-hardening sealant 110 on the common line 140, thereby degrading the adhesion since the photo-hardening sealant 110 is not hardened completely.

In FIG. 1B, an insulating layer 141 to form a gate insulating layer and a passivation layer is formed on the common line 140, and the photo-hardening sealant 110 is deposited on the insulating layer 141. Since the insulating layer 141 is transparent, the UV-ray is transmitted. However, since the common line 140 is opaque, the UV-ray is cut off by the common line 140. Hence, the photo-hardening sealant 110 cannot be hardened by the UV-ray, thereby weakening the adhesion.

A related art method of fabricating a liquid crystal display device using a liquid crystal dropping method is explained in detail as follows.

FIGS. 2A to 2G illustrate layouts and cross-sectional views of a related art fabricating process of a liquid crystal display device.

In the method of fabricating a liquid crystal display device using a liquid crystal dropping method, a plurality of liquid crystal display panel is designed on a mother substrate. More specifically, a plurality of liquid crystal display panels are designed on the mother substrate to form a thin film transistor array and a color filter array on each of the corresponding substrates. Liquid crystals are dispensed on the substrate. A sealant is deposited on the substrate, and the substrates are bonded to each other. The bonded substrates are then cut into a plurality of unit liquid crystal display panels. A plurality of the liquid crystal display panels designed on a single substrate will be explained in the following descriptions.

Although not shown in FIG. 2A, a plurality of gate and data lines are arranged on a first substrate 100 to cross each other and define a plurality of pixel areas. A pixel electrode (not shown) is formed on each of the pixel areas. A plurality of thin film transistors (not shown) are formed at each intersection between the gate and data lines to apply signals of the data lines to the pixel electrodes by being turned on/off through signals of the gate lines. A common line (not shown) is formed on the first substrate 100 to supply a common electrode with a common voltage. Herein, a plurality of liquid crystal display panels 99 are arranged on the first substrate 100.

Subsequently, a plurality of silver (Ag) dots 101 are formed on the common line of each of the liquid crystal display panels 99 to be electrically connected thereto.

As shown in FIG. 2B, liquid crystals 103 for the size of each liquid crystal display panel 99 is dropped on each of the liquid crystal display panels 99 of the first substrate 100.

As shown in FIG. 2C, a photo-hardening sealant 110 is deposited at the circumference of each liquid crystal display panel 99 of the first substrate 100.

As shown in FIG. 2D, a plurality of column spacers 105 are formed on a second substrate having a black matrix layer (not shown), a color filter layer (not shown), and a common electrode (not shown) formed thereon. And, the second substrate 150 is turned over to be placed over the first substrate 100.

Namely, the overturned second substrate 150 is fixed to an upper stage 170, which enables movement in the Z-axis direction (i.e., vertical direction), of a bonding machine having a controllable vacuum chamber. And, the first substrate 100 is fixed to a lower stage 160, which enables movement in the XY-axes direction (i.e., horizontal direction), of the bonding machine.

As shown in FIG. 2E, the first substrate 100 fixed to the lower stage 160 and the second substrate 150 fixed to the upper stage 170 are aligned. Then, the inside of the bonding machine is pumped down to have a desired vacuum condition. Hence, the first and second substrates 100 and 150 are bonded to each other. The first and second substrates 100 and 150 do not contact each other so as to form a first gap between the substrates 100 and 150.

As shown in FIG. 2F, after both of the substrates are bonded to have the first gap, a gas or air is injected into the bonding machine under a vacuum condition to provide the inner space of the bonding machine with the atmospheric pressure. Since the space between the bonded substrates is in a vacuum state and the surrounding is in the atmospheric pressure, both of the substrates are pressurized by a difference between the pressure within the gap between the first and second substrates and the atmospheric pressure. In this case, both of the substrates are pressurized to have a cell gap by the column spacers 105. Hence, the liquid crystals 103 are spread between the substrates to form a liquid crystal layer 103a.

As shown in FIG. 2G, UV-ray is applied from the side of the second substrate 150 to harden the photo-hardening sealant 110.

However, the related art liquid crystal display device and the method of fabricating the same have the following problems or disadvantages.

Since the common line on the first substrate blocks the UV-ray, the UV-ray should be applied to the first substrate from the upper side instead of the lower side.

Furthermore, when the UV-ray is applied from the upper side of the substrate, either a pattern of the black matrix layer is modified or the size of the substrate is increased, thereby misaligning the sealant from the black matrix layer.

SUMMARY OF THE INVENTION

Accordingly, the present invention is directed to a liquid crystal display device and a method of fabricating the same that substantially obviates one or more of problems due to limitations and disadvantages of the related art.

Another object of the present invention is to provide a liquid crystal display device and a method of fabricating the same that facilitate hardening of the photo-hardening sealant without modifying the black matrix layer pattern or increasing the size of the substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate having a thin film transistor array and a common line with a UV-ray irradiation path passing UV-rays, a second substrate having a color filter array, a sealant between the first and second substrates over the common line, and a liquid crystal layer between the first and second substrates.

In another aspect of the present invention, a method of fabricating a liquid crystal display device includes forming a thin film transistor array on an active area of a first substrate and a metal pattern as a UV-ray irradiation path passing UV-rays at a circumference of the active area, forming a color filter array on a second substrate, forming a sealant at the periphery of the active area of one of the first and second substrates to pass the UV-ray irradiation path, bonding the first and second substrates to each other after overturning the second substrate to dispose over the first substrate, and applying UV-ray to the photo-hardening sealant from a side of the first substrate through the UV-ray irradiation path to harden the sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1A:
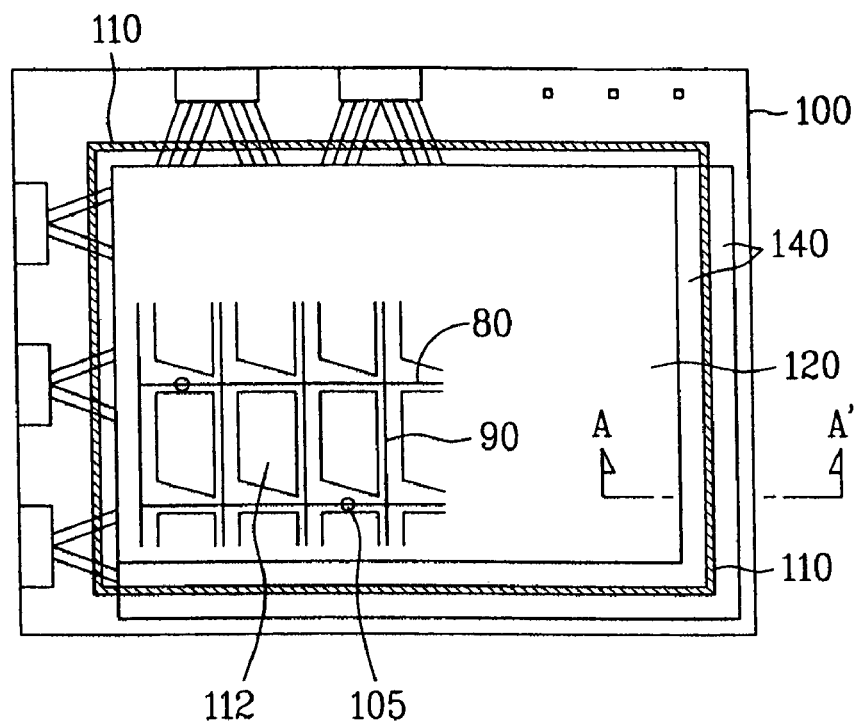
FIG. 1A illustrates a layout of a thin film transistor array substrate for a related art liquid crystal display device.
Figure 1B:
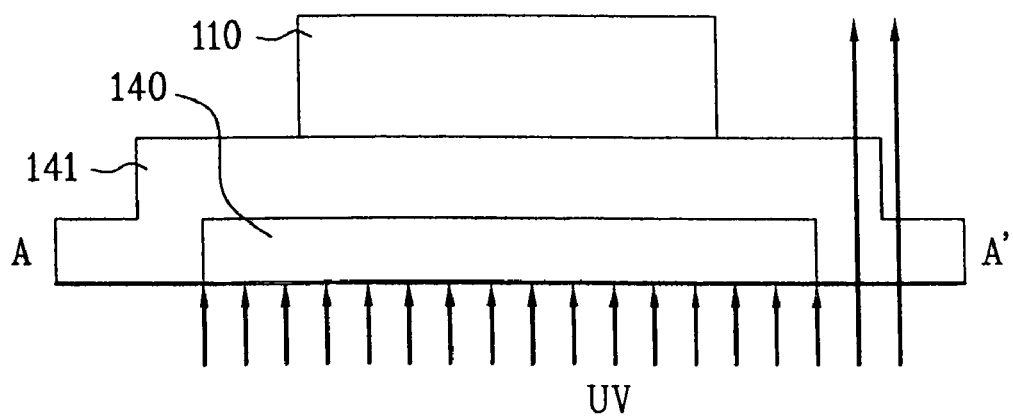
FIG. 1B illustrates a cross-sectional view taken along line IB-IB in FIG. 1A.
Figure 2A:
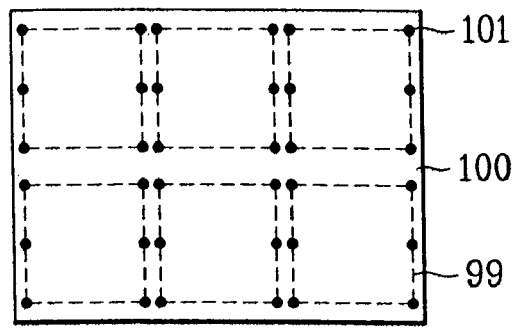
FIGS. 2A to 2G illustrate layouts and cross-sectional views of a related art fabricating process of a liquid crystal display device.
Figure 2B:
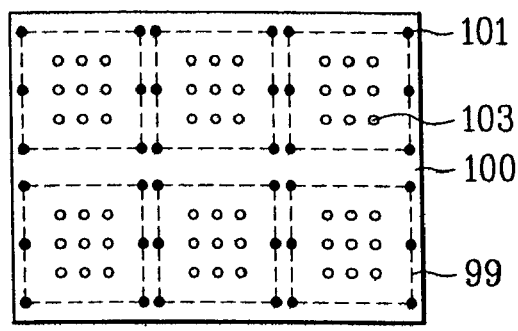
Figure 2C:
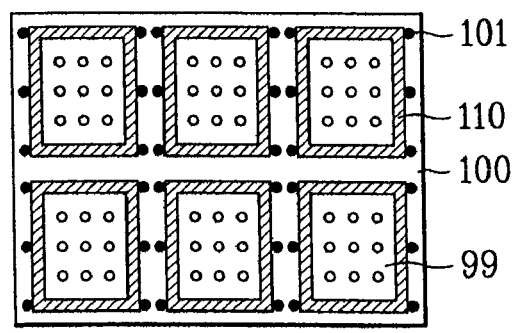
Figure 2D:
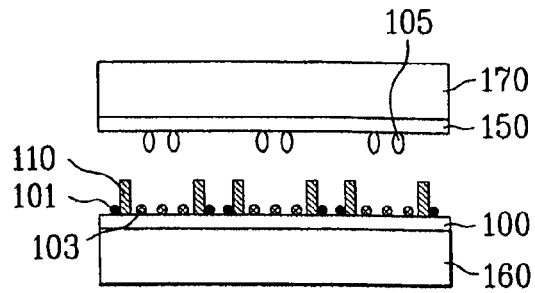
Figure 2E:
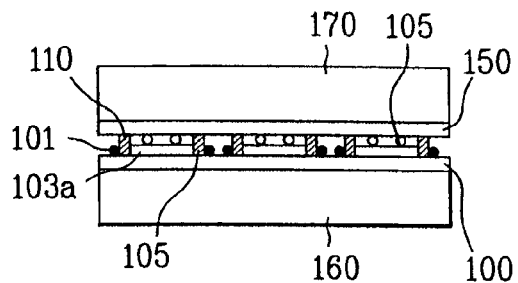
Figure 2F:
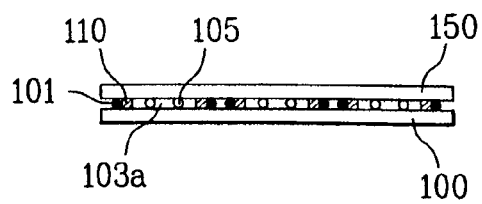
Figure 2G:
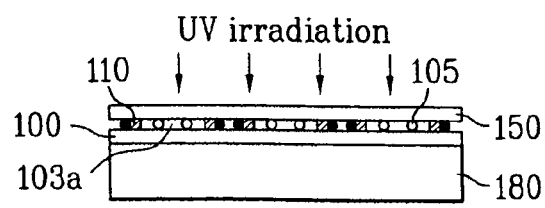
Figure 3:
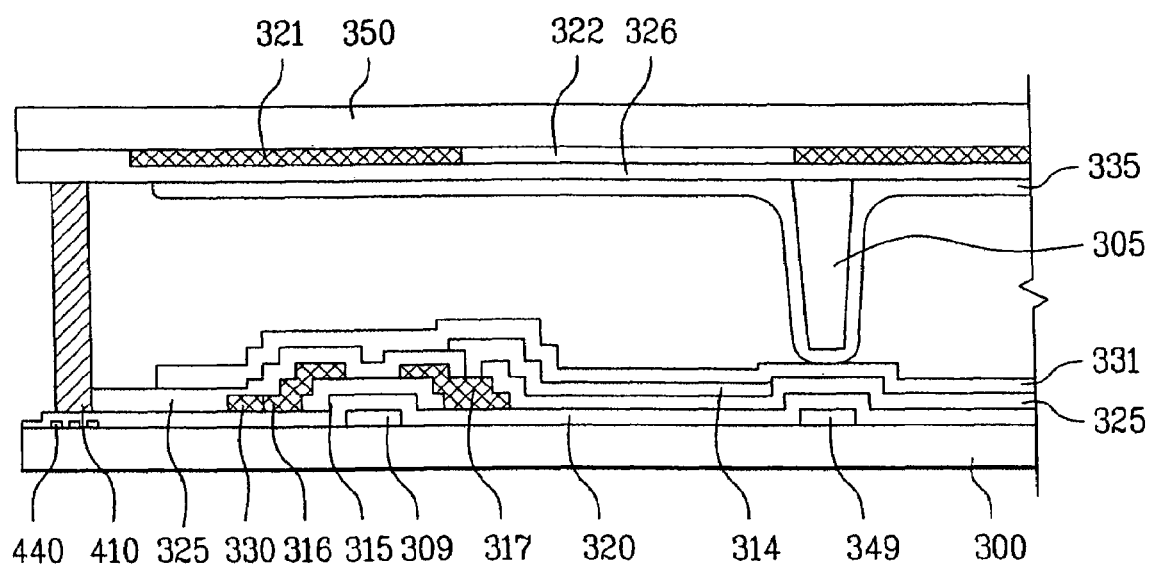
FIG. 3 illustrates a cross-sectional view of a TN type liquid crystal display device according to the present invention.

FIG. 3 illustrates a cross-sectional view of a TN type liquid crystal display device according to the present invention.

As shown in FIG. 3, a gate line 349, a gate electrode 309, and a common line 440 of a thin film transistor are formed on a first substrate 300. A gate insulating layer 320 is formed on the entire surface of the first substrate 300. The common line 440 supplies a common electrode with a common voltage and provides a UV-ray irradiation path through which UV-ray is applied to harden a sealant.

A semiconductor layer 315 is formed on the gate insulating layer 320 over the gate electrode 309. A data line 330 having source and drain electrodes 316 and 317 is formed at both sides of the semiconductor layer 315. Herein, when the source and drain electrodes 316 and 317 are formed over the gate line 349, a storage electrode may be formed to provide a storage capacitor.

A passivation layer 325 is formed on the entire surface including the source and drain electrodes 316 and 317 to provide a contact hole on the drain electrode 316. A pixel electrode 314 is formed on the passivation layer 325 in the pixel area to be connected to the drain electrode 316. A first alignment layer 331 is formed on the entire surface including the pixel electrode 314.

On a second substrate 350, a black matrix 321 is formed on a surface facing into the first substrate 300 to prevent a light leakage from a portion excluding the pixel area. And, a R/G/B color filter layer 322 is embedded in the black matrix 321.

A common electrode 326 is formed on the entire surface of the substrate including the color filter layer 322. A column spacer 305 is formed over the black matrix 321. A second alignment layer 335 is formed on the entire surface of the substrate including the column spacer 305. A photo-hardening sealant 410 is formed between the first and second substrates 300 and 350 on the edge portion of the liquid crystal display panel. And, liquid crystals are formed between the first and second substrates 300 and 350 in the liquid crystal display panel area. At this point, the photo-hardening sealant 410 is formed over the common line 440 having a UV-ray irradiation path.

The above-explained structure, wherein the photo-hardening sealant 410 is formed on the common line 440 having a UV-ray irradiation path, may be applied to various modes of liquid crystal display devices, such as vertical alignment (VA) mode, optically compensated birefringence (OCB) mode, ferroelectric liquid crystal (FLC) mode, reflective mode, horizontal electric field mode, and TN mode.

Figure 4A:
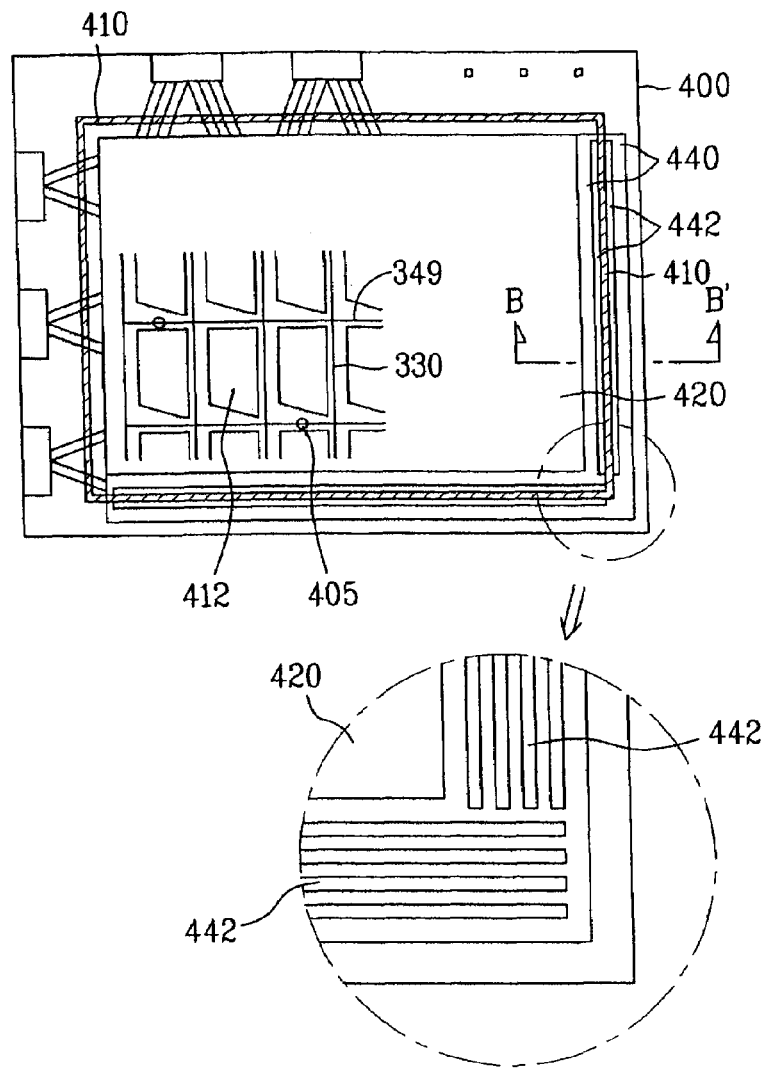
FIG. 4A illustrates a layout of a thin film transistor array substrate for a liquid crystal display device according to the present invention.
Figure 4B:
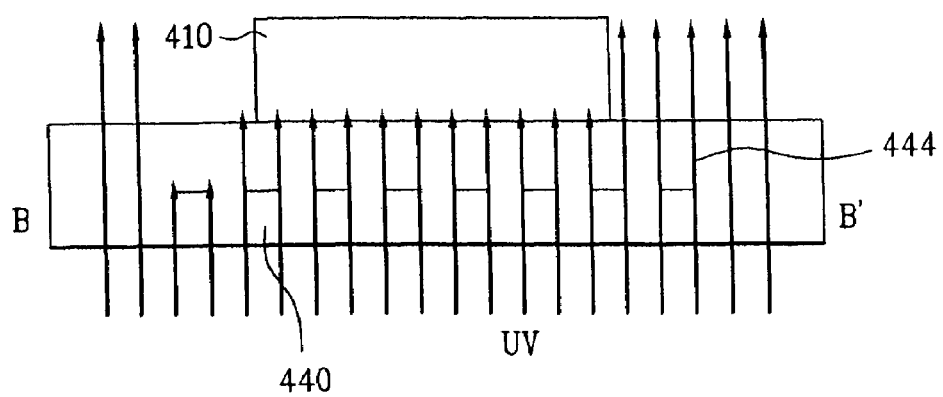
FIG. 4B illustrates a cross-sectional view taken along line IVB-IVB in FIG. 4A.

FIG. 4A illustrates a layout of a thin film transistor array substrate for a liquid crystal display device according to the present invention. FIG. 4B illustrates a cross-sectional view taken along line IVB-IVB in FIG. 4A.

As shown in FIG. 4A, a plurality of gate and data lines 349 and 330 are formed on an active area 420 of a thin film transistor array substrate 400 to cross each other, thereby defining a plurality of pixel areas. A pixel electrode 412 is formed on each of the pixel areas. A plurality of thin film transistors (not shown) are formed at each intersection between the gate and data lines 349 and 330 to apply signals of the data lines 330 to the pixel electrodes 412 by being turned on/off through signals of the gate lines 349.

A common line 440 is formed at the circumference of the active area 420 to provide a common electrode on a color filter array substrate (not shown) with a common voltage. And, a plurality of silver (Ag) dots (not shown) are formed at the common line 440 for electrical connection to the common electrode on the color filter array substrate.

Moreover, a column spacer 405 is formed on the gate line 349 or the data line 330 to maintain a uniform cell gap. And, a photo-hardening sealant 410 is formed at the circumference of the active area 420 to surround the active area 420 in order to bond the thin film array substrate and the color filter array substrate to each other. At this point, the photo-hardening sealant 410 is partially formed on the common line 440. The column spacer 405 and the photo-hardening sealant 410 may be formed on a second substrate 450 as a color filter array substrate instead of the first substrate 400, which acts as a thin film transistor array substrate. A path 442 through which UV-ray 444 is applied is formed in the common line 440. Alternatively, the common line 440 may be constructed with a plurality of lines each having a fine width to pass the UV-ray 444 (cf. magnified view in FIG. 4A). Furthermore, the path 442 can also be constructed with a plurality of circles or polygons formed along a portion on which the photo-hardening sealant 410 is formed.

Hence, after the bonding of both substrates by the photo-hardening sealant 410, the UV-ray can be applied to both of the substrates from the backside of the thin film transistor array substrate 400 instead of the side of the color filter array substrate.

In FIG. 4B, an insulating layer 441 for a gate insulating layer or a passivation layer is formed on the common line pattern 440, and the photo-hardening sealant 410 is deposited on the insulating layer 441. Even if the common line pattern 440 is opaque cutting off the UV-ray, a path 442 is formed in the common line pattern 440 to pass sufficient UV-ray through to harden the photo-hardening sealant 110. In this case, the path for UV-ray irradiation has an opening part having an opening ratio of at least about 50%.

The photo-hardening sealant 410 may be shrunk during the hardening process. Hence, a thermo-hardening sealant may be added to the photo-hardening sealant.

A method of fabricating a liquid crystal display device using a liquid crystal dropping method according to the present invention is explained in detail as follows.

FIGS. 5A to 5G illustrate layouts and cross-sectional views of a fabricating process of a liquid crystal display device according to the present invention.

As mentioned in the foregoing descriptions, more than one liquid crystal display panel is designed on a mother substrate. Thus, a plurality of liquid crystal display panels are designed on two substrates to form a thin film transistor array and a color filter array on the substrates, respectively. Liquid crystals are dropped on one of the substrates. A sealant is formed on one of the substrates,. and both of the substrates are bonded to each other. The bonded substrates are then cut into a plurality of unit liquid crystal display panels.

Figure 5A:
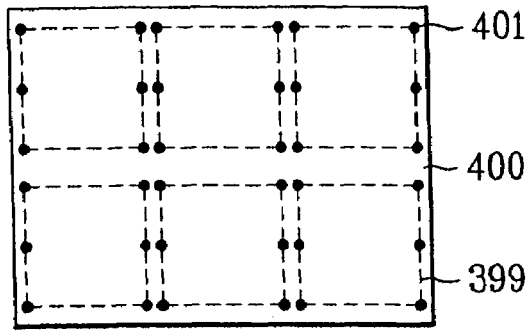
FIGS. 5A to 5G illustrate layouts and cross-sectional views of a fabricating process of a liquid crystal display device according to the present invention.

In FIG. 5A, a plurality of gate and data lines (not shown) are arranged on a first substrate 400 to cross each other and define a plurality of pixel areas. A pixel electrode (not shown) is formed on each of the pixel areas. A plurality of thin film transistors (not shown) are formed at each intersection between the gate and data lines to apply signals of the data lines to the pixel electrodes by being turned on/off through signals of the gate lines. A common line (not shown) is formed on the first substrate 400 to supply a common electrode with a common voltage. Herein, a plurality of liquid crystal display panels 399 are arranged on the first substrate 400, and the common line includes a UV-ray irradiation path, as described in FIGS. 4A and 4B.

Subsequently, a plurality of silver (Ag) dots 401 are formed on the common line of each liquid crystal display panel 399 to be electrically connected to the common line.

Figure 5B:
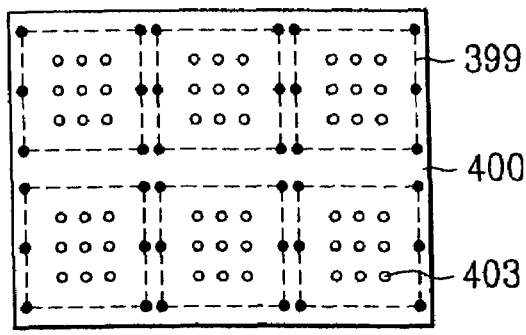

As shown in FIG. 5B, liquid crystals 403 for the size of each liquid crystal display panel 399 are dropped on each corresponding liquid crystal display panel 399 of the first substrate 400.

Figure 5C:
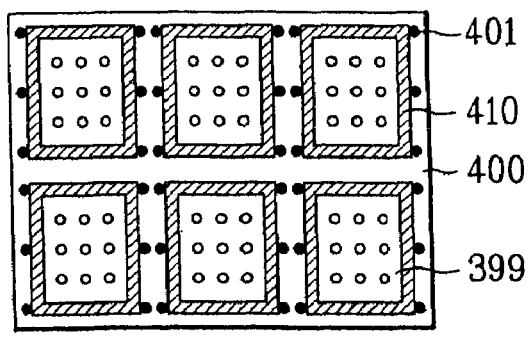

As shown in FIG. 5C, a photo-hardening sealant 410 is deposited at the circumference of each liquid crystal display panel 399 of the first substrate 400. The photo-hardening sealant 410 may also be deposited on a second substrate 450.

Figure 5D:
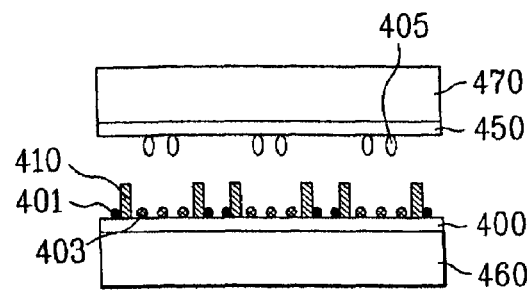

As shown in FIG. 5D, a plurality of column spacers 405 are formed on the second substrate 450 having a black matrix layer (not shown), a color filter layer (not shown), and a common electrode (not shown). The second substrate 450 is turned over to be placed over the first substrate 400. The column spacers 405 may also be formed on the first substrate 400.

The overturned second substrate 450 fixed to an upper stage 470, which enables movement in the Z-axis direction (i.e., vertical direction), of a bonding machine having a controllable vacuum chamber. The first substrate 400 is fixed to a lower stage 460, which enables movement in the XY-axes direction (i.e., horizontal direction) of the bonding machine.

Figure 5E:
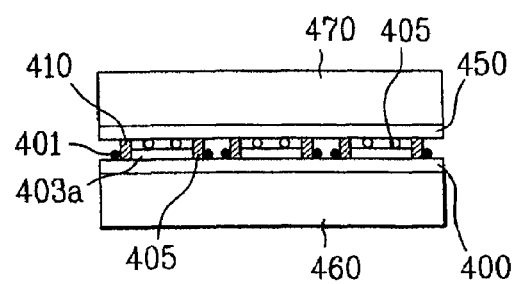

As shown in FIG. 5E, the first substrate 400 fixed to the lower stage 460 and the second substrate 450 fixed to the upper stage 470 are aligned. Then, the inside of the bonding machine is pumped down to have a desired vacuum condition. Subsequently, the first and second substrates 400 and 450 are bonded to each other. At this point, the first and second substrates 400 and 450 do not entirely contact each other, so as to form a first gap between the substrates 400 and 450.

Figure 5F:
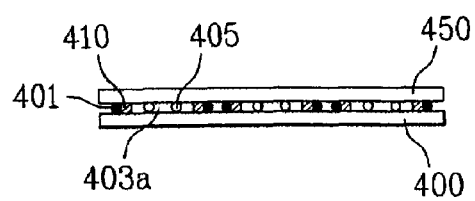

As shown in FIG. 5F, after both of the substrates are bonded to have the first gap, a gas or air is injected in the bonding machine under a vacuum condition to make an inner space of the bonding machine have the atmospheric pressure. Since the space between both of the substrates bonded through the sealant is in a vacuum condition and the surrounding is in atmospheric pressure, both of the substrates are pressurized by a difference between the pressure within the gap between the first and second substrates and the atmospheric pressure. In this case, both of the substrates are pressurized to have a cell gap by the column spacers 405. Hence, the liquid crystals 403 are uniformly spread between the substrates to become a liquid crystal layer 403a.

Figure 5G:
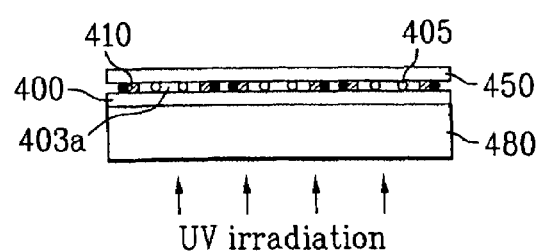

As shown in FIG. 5G, the bonded substrates are placed on a transparent quartz stage 480. UV-ray is then applied from the side of the first substrate 400 to the photo-hardening sealant 410 to be hardened.

In the above-described embodiment of the present invention, the liquid crystals 403 are dropped on the first substrate 400 only. The photo-hardening sealant 410, the silver (Ag) dots 401, and the column spacers 405 may be formed on either the first substrate or the second substrate.

Accordingly, the liquid crystal display device and the method of fabricating the same according to the present invention have the following effects or advantages.

The UV-ray irradiation path is formed in the common line formed on the thin film transistor array substrate, thereby hardening the sealant by applying the UV-ray from the backside of the thin film transistor array substrate.

Moreover, since the sealant can be hardened by forming the UV-ray irradiation path in the common line of the thin film transistor array substrate, a substrate size does not have to be increased.

It will be apparent to those skilled in the art that various modifications and variations can be made in the liquid crystal display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:
   forming a thin film transistor array on an active area of a first substrate and a metal pattern including a UV-ray irradiation path passing UV-rays at a circumference of the active area;
   forming a color filter array on a second substrate;
   forming a sealant at the periphery of the active area of one of the first and second substrates to pass the UV-ray irradiation path, wherein the UV-ray irradiation path extends substantially the length of the metal pattern and extends to the same direction as the length of the sealant to expose the sealant;
   bonding the first and second substrates to each other after overturning the second substrate to dispose over the first substrate; and
   applying UV-ray to the sealant from a side of the first substrate through the UV-ray irradiation path to harden the sealant.

2. The method of claim 1, wherein the sealant includes a mixture of a photo-hardening sealant and a thermo-hardening sealant.

3. The method of claim 1, wherein the metal pattern is formed to be a plurality of lines having a width wide enough to pass the UV-rays.

4. The method of claim 1, wherein the metal pattern is a common wiring to apply a common voltage to a common electrode formed on the second substrate.

5. The method of claim 1, wherein the UV-ray irradiation path is formed to have a plurality of polygonal or circular holes.

6. The method of claim 1, further comprising forming a column spacer between the first and second substrates.

7. The method of claim 1, wherein the UV-ray irradiation path is formed to have an opening ratio of at least about 50%.

8. A method of fabricating a liquid crystal display device, comprising:
   providing a first substrate and a second substrate;
   forming a metal pattern including a UV-ray irradiation path passing UV-rays on one of the first and second substrates;
   forming a sealant at the periphery of an active area of said one of the first and second substrates to pass a UV-ray, wherein the UV-ray irradiation path extends substantially the length of the metal pattern and extends to the same direction as the length of the sealant to expose the sealant;
   flipping one of the first and second substrates;
   loading the first and second substrates into a bonding chamber;
   maintaining a first pressure within the bonding chamber;
   aligning the first and second substrates with each other;
   bonding the first and second substrates together via the sealant; and
   applying UV-ray to the sealant from a side of the first substrate through the UV-ray irradiation path to harden the sealant.

9. The method of claim 8, wherein the sealant includes a mixture of a photo-hardening sealant and a thermo-hardening sealant.

10. The method of claim 8, wherein the metal pattern is formed to be a plurality of lines having a width wide enough to pass the UV-rays.

11. The method of claim 8, wherein the metal pattern is a common wiring to apply a common voltage to a common electrode formed on the second substrate.

12. The method of claim 8, wherein the UV-ray irradiation path is formed to have a plurality of polygonal or circular holes.

13. The method of claim 8, further comprising forming a column spacer between the first and second substrates.

14. The method of claim 8, wherein the UV-ray irradiation path is formed to have an opening ratio of at least about 50%.

15. The method of claim 8, wherein the metal pattern is formed at the circumference of the active area.

* * * * *